Feb. 14, 1956 J. A. CLEIFF 2,734,370
SAFETY DEVICE OF AND FOR POWER-DRIVEN WRINGERS
Filed Nov. 15, 1951 3 Sheets-Sheet 1
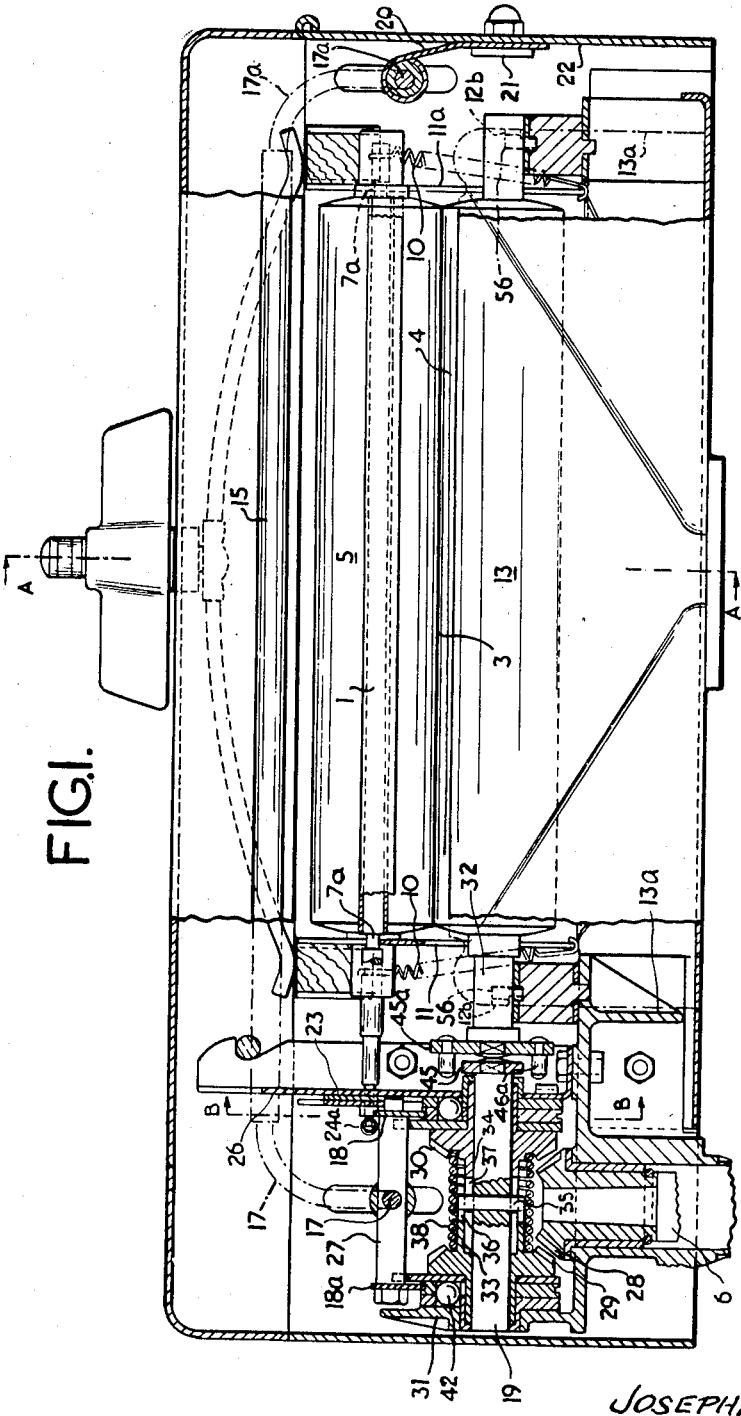
INVENTOR
JOSEPH A. CLEIFF Feb. 14, 1956   J. A. CLEIFF   2,734,370
SAFETY DEVICE OF AND FOR POWER-DRIVEN WRINGERS
Filed Nov. 15, 1951   3 Sheets-Sheet 2
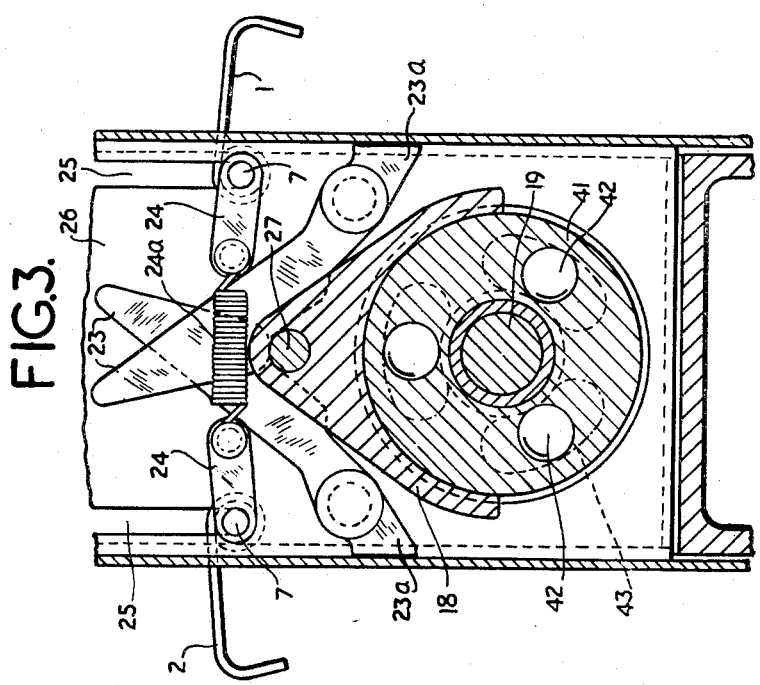
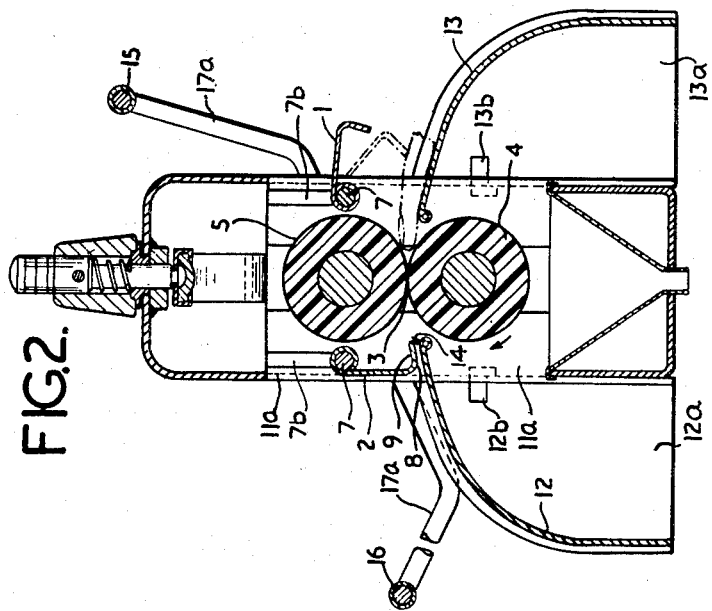
INVENTOR
JOSEPH A. CLEIFF Feb. 14, 1956  J. A. CLEIFF  2,734,370
SAFETY DEVICE OF AND FOR POWER-DRIVEN WRINGERS
Filed Nov. 15, 1951  3 Sheets-Sheet 3
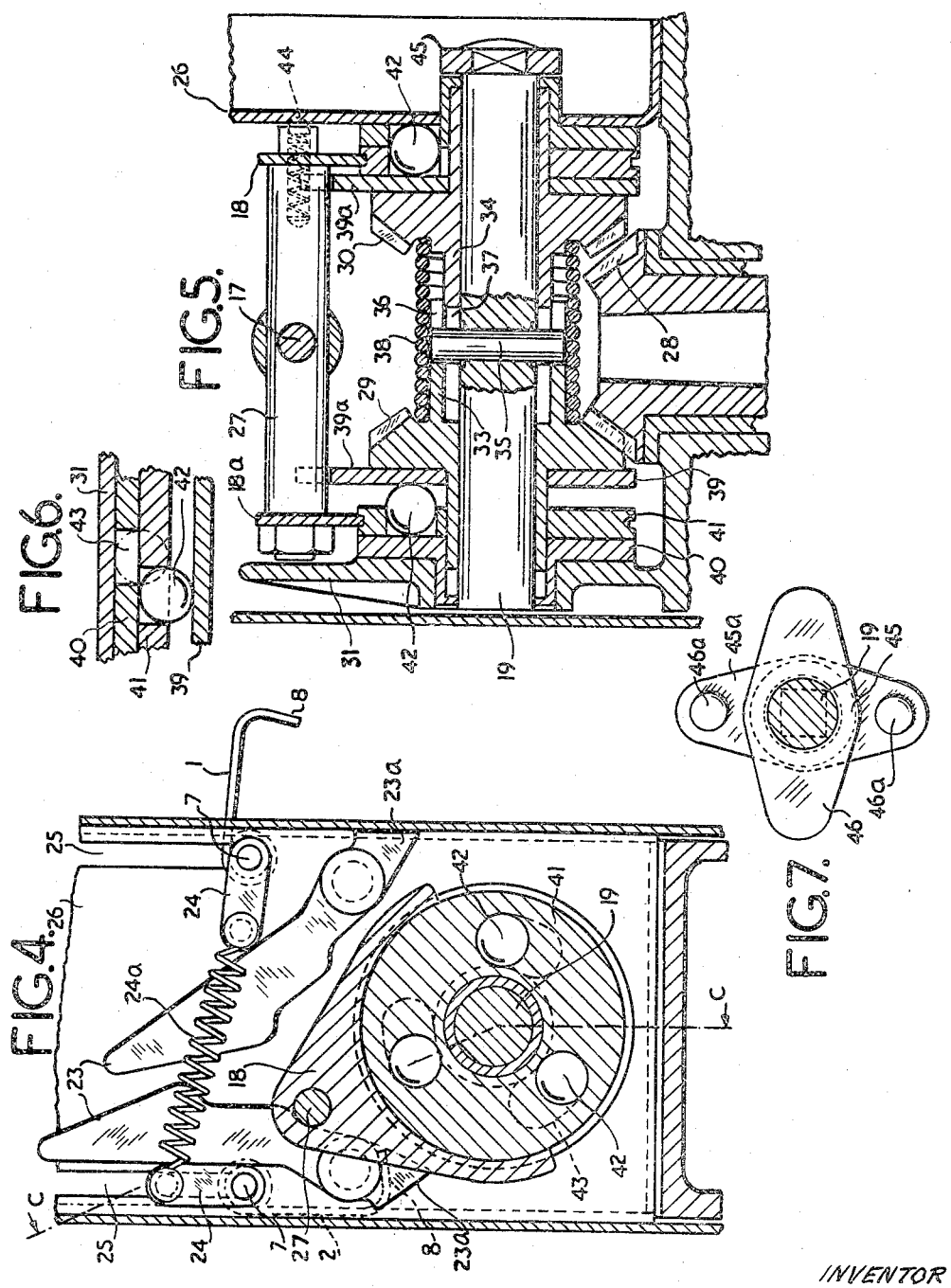
INVENTOR
JOSEPH A. CLEIFF United States Patent Office 2,734,370
Patented Feb. 14, 1956

2,734,370

SAFETY DEVICE OF AND FOR POWER-DRIVEN WRINGERS

Joseph Alexander Cleiff, Birmingham, England, assignor to Aluminum Bronze Company Limited, Walsall, England Application November 15, 1951, Serial No. 256,433

Claims priority, application Great Britain April 5, 1951

6 Claims. (Cl. 68—249)

This invention relates to safety devices of and for power-driven wringers and it has for its object the provision of a device directed to improving the margin of safety.

Commonly-used mechanism for releasing spring pressure on the rollers of domestic wringers by user actuation of a "knock-off" member, has the obvious shortcoming that trapping of the user's hands precedes emergency release of the pressure, and that some degree of injury results in most instances.

The object of the present invention is a safety device which substantially avoids the risk of inadvertent trapping of the user's hands or fingers, and warns the user of undesirable proximity of fingers to the danger zone before power is applied.

Reference may be had to the accompanying drawings in which Figure 1 is an elevation of a wringer according to the present invention the gears and other parts being shown in neutral position and the central portion being shown in elevation whereas each of the two end portions is shown in section.

Figure 2 is a sectional elevation on line A—A of Figure 1 but showing certain parts in the positions they assume when drive is imparted to the rollers.

Figure 3 is a sectional end view, drawn to an enlarged scale, on line B—B of Figure 1.

Figure 4 is a similar view to Figure 3 but with the parts shown in positions they occupy with one of the gears in mesh.

Figure 5 is a sectional end view on line C—C of Figure 4 showing one of the gears in mesh. Figure 6 is a fragmentary view of parts of a gear moving mechanism and Figure 7 is a fragmentary view of parts of the drive transmission mechanism.

In the power-driven wringer shown in the drawing, there are provided three mechanisms i. e. a mechanism for actuating shutter 1, 2 movable from an open position to a closed one which prevents direct access of fingers to the nip 3 of the rollers 4, 5; a drive transmission mechanism for connecting the driven roller 4 to the power input shaft 6, and a selector mechanism which connects the shutter actuating mechanism and the drive transmission mechanism so that they co-operate to bring either the one or the other shutter into safe position before drive is imparted to the rollers.

Shutter operating mechanism includes the shutter 1 at the front of the wringer and the other 2 at the back thereof, both of which have a common open position, as shown in Figure 3, corresponding to a neutral position of the drive transmission mechanism and which are operated by means which ensure displacement of the one or of the other into a guarding position before power is applied for forward or reverse driving respectively. Preferably each shutter consists of a sheet or plate fixed at its upper edge to a rod 7 journalled in transverse partitions or frame members 11, 11a and positioned and dimensioned to bring the lowest portion 8 of the bottom edge a suitable distance, e. g. ¼" below the nip 3 of the rollers when the shutter is in its closed position. At its lower edge, the shutter is shaped to propel during the final segment of its angular movement, the clothes presented, into the nip of the rollers; accordingly, said edge may be turned over and continued in a straight (or curved) portion 9, Figure 2, which makes a small angle to the horizontal and terminates at a suitable distance, e. g. 1", from the nip when the shutter is vertical and in its closed position. To enable material to pass the shutter without damage occurring, the corresponding rod 7 is mounted so that it can yield and rise vertically under strong pressure as the rollers draw the material into the nip. This function is conveniently attained by means of coiled tension springs 10, Figure 1, hooked on to each end of each rod 7 and to the partitions 11, 11a, said ends being guided up and down by peripheral grooves 7a therein which engage slots 7b, Figure 2, in said partitions.

At the front and also at the back of the wringer are fixed clothes guides 12, 13 the upper edges of which extend close to the periphery of the lower roller, see Figure 2, are tangential to and are positioned, say about ½", below the roller nip so that they provide at their upper surface either a very small gap 14 or no gap relative to the shutters when closed, and curve downwardly in a direction away from the rollers. Such gap forms a passage tangential to the nip. To stiffen the clothes guides, they are provided with end plates 12a, 13a having L-shaped projections 12b, 13b, Figure 2, which are inserted through vertical slots 56 Figure 1, in the back and front walls, respectively, of the casing 22 of the wringer and are then allowed to spring into lateral pockets formed in the slots to engage the lower edges of the said pockets in a hook-like action and thereby fix the guides to and externally of the said casing; other fixing means may however be used.

To operate the shutter operating, drive-transmission and selected mechanisms, at the front and back of the wringer are incorporated manually-operable control bars 15, 16 extending lengthwise of the machine and situated a convenient distance above the clothes guides to allow access thereto for manipulation of articles for wringing, said bars being mounted for joint movement about a common fulcrum which, preferably, is coaxial with the lower roller 4. Each control bar is U-shaped with two parallel limbs 17 and 17a. The limbs 17 are fixed perpendicularly to and on opposite sides of a control 27 that extends between and is fixed with two spaced arms 18, 18a which are articulated about a central gear shaft 19, as shown in Figures 1 and 5, that is coaxial with the lower roller. The limbs 17a are similarly fixed to an arm 20 at the opposite end of the roller 4, which arm is pivoted on a pin 21 that is fixed to the wringer casing 22 coaxially with the lower roller. In mid or neutral position of the driving gears, as shown in Figures 1 and 3, both bars are at the same level, but are movable up or down by the user for forward or reverse drive; when one bar is raised, the other moves down, and vice-versa, as shown in Figure 2.

The shutter selector mechanism comprises the said lever arm 18 which by tappet contact with the one or the other of two intermediate levers 23, Figures 3 and 4, between which the arm 18 extends each intermediate lever having itself a tappet connection with a corresponding crank 24 on the shutter rod 7, is adapted to turn the crank against the pull of a spring 24a from a substantially horizontal position corresponding to open position of the shutter to an upright position (as shown in the left hand side of Figure 3) corresponding to the closed position of the shutter; each of the said levers 23 is fulcrumed on a third transverse partition or frame member 26 and is provided with a bracket-like extension 23a which is adapted to abut the internal surface of the back or front (as the case may be) of the casing 22 to limit the spring-driven angular movement of the lever. The straight contact edge of the intermediate lever when vertical acts as a guide for the crank arm in an up-or-down motion when the shutter yields to allow passage of exceptional thickness of material into the rollers. The levers 23, and cranks 24 are in duplicate, one set for each shutter. Two spaced slots 25 in the partition 26 allow for up-and-down motion of the extended ends of the rods 7.

The angular movement of the control bars 15, 16 is adapted to turn about the central shaft 19, the lever arms 18 and lever 18a, Figures 1 and 5, joined by the bar 27, which lever arms form parts of the drive transmission mechanism now to be described and have the characteristic of small angular movement for full travel of the gear wheels, being therefore particularly suitable for use in association with the shutter operating mechanism before described.

The drive transmission mechanism illustrated in Figures 1 and 5 includes a driving bevel wheel 28 rotatable about an upright axis, and a pair of driven bevel wheels 29, 30 rotatable about a horizontal axis and also movable along said axis for selective enmeshment with or disengagement from the driving wheel to provide forward and reverse drive. The two driven wheels 29, 30 are slidably but non-rotatably mounted on the central shaft 19 which is supported on the partition 26 and frame 31 and transmits the driving torque to one of the roller shafts, conveniently the lower one 32. In one arrangement, the hubs 33, 34, of the two driven wheels telescope the one within the other and are drivingly connected with the central shaft by a transverse pin 35 which co-operates with slots 36, 37 in the hubs to allow the sliding movement.

Intermediate to the two driven wheels is placed a spring 38 of the coiled compression type with its end coils abutting against the respective inner faces of the two wheels 29, 30 to press them into the demeshed position under the control of meshing devices which are arranged to operate on the outer faces of the two wheels.

Each meshing device includes three coaxial contiguous discs which will be referred to as inner 39, outer 40, and intermediate 41 with the faces of the intermediate one in contact with the inner faces of the inner and outer discs in the unmeshed position of the wheel. The outer disc 40 is static, the intermediate disc 41 is fast with the respective lever arm 18, 18a and is mounted for a restricted amount of angular movement about the axis of the shaft, and the inner thrust disc 39 next to the wheel can move axially but is inhibited from turning more than said restricted amount by a radial arm 39a slidably engaging at its outer end, the bar 27.

At equal angular distances in the outer and intermediate discs 40, 41 are formed holes wherein are housed a like number, say three or four, of balls 42 (though plungers with ball ends may be used as an alternative) arranged with slightly less than one half of each ball contained in the outer disc and the remainder slightly more than one half in the intermediate disc when in the unmeshed position shown in Figure 1, the diameter of a ball being equal to the joint thickness of the two discs. The holes in the outer discs are closed in the one meshing device by the adjacent partition 26, and in the other meshing device by the frame 31 of the wringer. When the intermediate disc is moved angularly about its axis carrying the balls with it in a like motion, the balls climb the walls of the holes in the outer disc 40 on to the inner face thereof as depicted in Figure 6 and in so doing have imparted to them an axial movement equal to the depth of the holes i. e. the thickness of the static disc, in the present instance. In moving axially, the balls protrude from the intermediate disc and move axially the inner disc 39 as indicated in Figure 5 and through it the adjacent gear wheel (in the instance cited 29) which is thus meshed with the driving wheel 28 against the reactive pressure of the spring 38. By an angular reverse movement of the intermediate disc, the several movable parts return to their starting positions seen in Figures 1 and 3, and the wheel 29 is demeshed from the driving wheel by the spring.

As before mentioned, a wheel meshing device is placed at the back of each of the two driven wheels 29, 30, and to provide for the three positions of forward, neutral, and reverse, the holes 43, see Figures 3 and 4, in the outer disc are elongated to an arcuate shape. The slots in one outer disc are opposite in an angular direction relatively to those in the other outer disc (one set being shown in dotted lines and the other set in dot-and-dash lines, Figure 3) in order that an anti-clockwise movement jointly of the intermediate discs from neutral position finally results in one of the driving wheels being enmeshed to impart drive to the shaft 19 in one direction, while a similar but clockwise movement of the said intermediate discs from neutral enmeshes the other driving wheel, to impart drive to the said shaft 19 in the opposite reverse direction.

A typical spring-action ball detent 44 or the like may be incorporated at any suitable position, such as within a bore in the inner end of the bar 27 as shown in Figure 5, which co-operates with three depressions or sockets in the partition 26 to hold the lever arms 18, 18a and connected parts in any one of the three positions before indicated.

In the transmission shaft, between the driven wheels and the lower roller, is incorporated any axial coupling (see Figures 1 and 7) having angular lost motion by which a movement of either of the driven wheels is at all times effected without loading from roller drive reaction. This coupling, as best shown in Figures 1 and 7, may suitably comprise a pair of plates 45, 45a respectively fixed to the adjacent ends of the central gear shaft 19 and the lower roller shaft 52. One of said plates 45 has a plurality of radially extending arms 46, two such arms being shown, and the other of said plates 45a has a plurality of axially extending crank pins 46a which extend into the path of the arms 46.

When the one or the other control bar is depressed by the user from middle or neutral position shown in Figure 1, corresponding to neutral position of the driven gear wheels, the shutter on the same side of the wringer as the control bar being depressed is turned about the axis of its rod 7 until its lower edge reaches the vicinity of the clothes guide. If the user's fingers on the hand which is pushing the clothes towards the rollers are in the danger zone, the lower edge of the shutter comes into contact with the top surface of the fingers as indicated in dotted lines in Figure 2 and is thereby stopped from farther advancement towards the closed position; at this point, the relevant driven gear wheel is not meshed sufficiently to drive but further closing movement of the shutter is accompanied by an effective movement of the corresponding wheel meshing device. From this point, further axial displacement of the one set of balls fully mesh the wheel as shown in the left hand side of Figure 5, while the other set of balls continue in an idle orbital path without axial motion, due to the elongated slots 43 as illustrated in Figure 4. As above indicated in the description of the wheel meshing devices of the device-transmitting mechanism, only a small angular movement of the lever arms 18, 18a moving the balls corresponding to half the ball diameter, is needed to mesh the wheel fully, and this small movement is sufficient, in the absence of obstructing fingers, to turn the shutter to fully closed, upright, position wherein the fingers are prevented from access to the nip of the rollers.

When the lower edge of the shutter comes into contact with the clothes presented, they are fed by a pushing action into the roller nip. If the thickness presented exceeds the size of the gap, the clothes are compressed by the lower edge of the shutter; if the compressed thickness still exceeds the gap, there is a rise of the shutter against its spring 10 before described according to the thickness presented, while following thicknesses appropriately vary the gap if needed in similar manner. Fingers not being appreciably compressible, and the shutter acting at an angle to the vertical when making contact with the fingers, ensures that the shutter in such conditions cannot push the fingers or allow them to be advanced towards the nip of the rollers; further, at the finger contact angle, the relevant driven gear wheel is either not engaged at all or so lightly that any slight loading of the rollers by fingers would cause the gear wheel to be retracted and the control bar and connected parts to fly back to the neutral position. Manual or other pressure on the shutter when in closed position, directed towards the nip, would be resisted by the crank arm 24 shown at the left side of Figure 4, abutting against the adjacent inner surface of the wringer casing which thus acts as a stop.

Having thus described my invention, what I claim is:

1. A power-driven wringer comprising a pair of rollers journalled in close juxtaposition and forming a nip therebetween, a driving gear rotatable about one axis and two co-axial driven gears rotatable about an axis at right angles to the axis of the driving gear and axially displaceable independently of one another for transmitting forward or reverse drive to the shaft of one of said rollers, means for selectively engaging either of the driven gears with the driving gear including for each driven gear a member angularly movable about the axis thereof and another member static relative to said axis, slidable elements which, when the corresponding driving gear is disengaged from the driving gear, are housed partly in and are angularly displaceable by the said movable member and partly in the static member, said element when angularly displaced by angular movement of the movable member relatively to the static member having also an axial movement which is transmitted to the corresponding driven gear, a guide on each side of the rollers in proximity to the roller nip for directing materials thereto, a shutter on each side of the rollers movable between an open position and a closed position wherein it co-operates with the materials guide to allow passage of materials to but prevent access of fingers to the roller nip, operating members for transmitting movement both to the slidable elements and to the shutters, and a manually operable control member for actuating said operating members.

2. A power-driven wringer comprising a frame, a pair of rollers journalled on said frame in close juxtaposition and forming a nip therebetween, a fixed guide disposed below but in close proximity to the nip for directing materials thereto, a rod on said frame, a shutter fixed to and lengthwise of said rod, said rod being located above the nip and rotatable about its axis for moving the shutter between an open position and a closed position wherein it extends downwardly of the rod, said shutter having an edge adjacent the guide and spaced from the latter to permit passage of materials but prevent access of obstructing fingers to the roller nip, the said rod being yieldably mounted on said frame for up and down movement to permit passage of materials of varying thickness between the shutter and guide, said rod having a crank arm fixed to one end thereof, a lever fulcrumed on said frame, said crank arm engaging said lever, said lever being rockable about its fulcrum to swing the arm about the axis of, and impart shutter-actuating rotary movement to, said rod, a power input shaft, and means for rocking the lever to move the shutter to the closed position and for releasably coupling said shaft to one of said rollers to impart drive to said one of said rollers during the latter portion of the shutter movement.

3. A power-driven wringer according to claim 2 comprising a driven shaft, a driving gear fixed to the said power-input shaft, a driven gear carried by said driven shaft, said driven shaft located at right angles to the input shaft and co-axially with the driven roller, the said driven shaft being coupled to the said roller and the said driven gear being displaceable lengthwise of the said driven shaft into and out of engagement with said driving gear, and means rotatable about the driven shaft for rocking the crank-arm engaging lever so as to move the shutter to the closed position, and for displacing the driven gear lengthwise of the driven shaft into engagement with the driving gear during the latter portion of the said shutter movement.

4. A power-driven wringer according to claim 2 comprising a driven shaft, a driving gear fixed to the power-input shaft, a driven gear carried by said driven shaft, said driven shaft being located at right angles to the input shaft and co-axially with the driven roller, the said driven shaft being coupled to the said roller through a lost-motion connection, the said driven gear being displaceable lengthwise of the driven shaft into and out of engagement with the driving gear, and means rotatable about the driven shaft for rocking the crank-arm engaging lever so as to move the shutter to the closed position and for displacing the driven gear lengthwise of the driving gear during the latter portion of the said shutter movement.

5. A power-driven wringer according to claim 2 comprising a driven shaft, a driving gear fixed to the power-input shaft, a driven gear splined upon said driven shaft located at right angles to the imput shaft and co-axially of the driven roller, the said driven shaft being coupled to the said roller and the said driven gear being displaceable lengthwise of the driven shaft into and out of engagement with the driving gear, a displaceable control bar, a radial arm carried by and rotatable about the driven shaft and engaging said control bar, means operable by the rotation of said radial arm for engaging and disengaging the driven gear with and from the driving gear, said control bar being disposed parallel to the driven shaft and engaging the crank-arm engaging lever, a manually operable handle secured to the said control bar for displacing the latter to rock said lever and move the shutter to the closed position and for turning said radial arm about the driven shaft so as to displace the driven gear into engagement with the driving gear during the latter portion of the shutter movement.

6. A power-driven wringer comprising a pair of rollers journalled in close juxtaposition and forming a nip therebetween, two fixed guides disposed on opposite sides of the rollers and below but in close proximity to the nip, two shutters also disposed on opposite sides of the rollers, two rods located above the nip and respectively fixed to one of said shutters, each of said rods being rotatable about its longitudinal axis for moving the respective shutter between an open position and a closed position in which the edge of said shutter adjacent the corresponding guide is spaced from said guide by a distance permitting passage of materials but preventing access of obstructing fingers to the roller nip, a lever journalled about an axis disposed below but parallel to each rod, a crank arm fixed to one end of each rod, each arm extending from the rod to which it is secured in the opposite direction to the shutter fixed to said rod and into abutment with the respective lever, means disposed between the two levers for selectively rocking one of the levers to turn the corresponding crank-arm, rod and shutter in the direction which moves the shutter to the closed position, a driven shaft disposed co-axially of and coupled to one of the rollers, said lever-rocking means being angularly displaceable in opposite directions about said driven shaft for transmitting drive to said roller, an input shaft located at right angles to said driven shaft, a driving gear secured to said input shaft, two driven gears mounted on the driven shaft on opposite sides of the driving gear and displaceable lengthwise of the driven shaft for releasable engagement with the driving gear, and means actuated by said lever-rocking means when angularly displaced about the driven shaft for selectively displacing one of the driven gears into engagement with the driving gear during the latter part of the movement of the respective shutters to the closed position.

References Cited in the file of this patent

UNITED STATES PATENTS

| | | |
|---|---|---|
| 1,479,495 | Bradford | Jan. 1, 1924 |
| 1,547,484 | Wuerpel | July 28, 1925 |
| 1,713,686 | Beatty | May 21, 1929 |
| 2,102,154 | Hill | Dec. 14, 1937 |
| 2,207,436 | Lundstrom | July 9, 1940 |